Patented Feb. 20, 1934

1,948,323

UNITED STATES PATENT OFFICE 1,948,323

MEDIA FOR REGENERATING VISCOSE

William D. Wolfe, Akron, Ohio, assignor to Wingfoot Corporation, Wilmington, Del., a corporation of Delaware No Drawing. Application October 18, 1929
Serial No. 400,737

9 Claims. (Cl. 18—54)

This invention relates to methods of treating viscose to regenerate the cellulose therein contained. More particularly, it relates to a method of regenerating cellulose in situ from viscose coated on or otherwise associated with a fabric. Among other things, the invention provides an economical method of regenerating viscose characterized by the substantial prevention of the formation of hydrogen sulfide bubbles within the material.

In the manufacture of gas cells for lighter-than-aircraft, the fabric to be employed is coated with a material which, with respect to the gas employed for inflation purposes, is highly impermeable. Various media such as gold beater's skin, rubber and certain cellulose compositions have been used heretofore in this capacity. They have, however, not been wholly practicable. In order to be practicable, the coating material must be durable, highly flexible and practically impermeable. It must also be relatively inexpensive to procure and to apply to the fabric.

From the standpoint of impermeability, flexibility and general durability, gold beater's skin is perhaps the best of the materials heretofore employed. However, it is relatively expensive to obtain and, since it is obtained in small units six or eight inches square, its application to gas cells for lighter-than-aircraft, is extremely tedious and expensive.

Rubber, another of the materials heretofore used, is inexpensive to obtain and may be applied to the fabric by quick and inexpensive methods. However, it is comparatively permeable to such inflating gases as hydrogen and helium. For that reason, its use entails great loss of those gases when fabric treated therewith is employed in the larger sizes of aircraft.

It has also been observed that some forms of regenerated cellulose, particularly when intermixed with suitable softeners such as glycerine, offer high resistance to the escape of the inflating gases and are relatively inexpensive to obtain and easy to apply to the fabric. One of the most satisfactory forms of cellulose heretofore experimented with is obtained by the regeneration of certain mixtures of viscose (the reaction product of cellulose, sodium hydroxide and carbon bisulfide) in situ upon the fabric.

Unfortunately the regeneration of the viscose is attended by one disadvantage which has heretofore been difficult of solution, this disadvantage consisting in the fact that the viscose upon regeneration gives off considerable quantities of hydrogen sulfide gas. This gas tends to form bubbles between the fabric and the coating media, which in some cases cause the coating material to peel from the fabric. It also gives rise to other imperfections.

This invention consists in the discovery that solutions of certain boron compounds such as borax and boric acid, when treated with polyhydroxy compounds such as glycerol, dextrose, and levulose, may be employed to good advantage as media for regenerating viscose. There use reduces the formation of gas bubbles within the coating material to a minimum. The success of borax and boric acid in regenerating media is apparently in part due to an increase in the hydrogen ion concentration resulting from the addition of the polyhydroxy material. Various organic polyhydroxy compounds, among them glycerol, glycol, dextrose and levulose, may be used for this purpose.

A convenient rule for determining the value of polyhydroxy compounds as promotors of ionization in boron compounds is described in an article contained in Industrial and Engineering Chemistry, February, 1924, page 123. According to this article, any polyhydroxy compound containing at least two hydroxyl groups attached to adjacent carbon atoms in the chain and situated upon the same side of the chain is effective for this purpose. This increase in hydrogen ion concentration apparently is due to the formation of complex acids as a result of the addition of the polyhydroxy compound. These complex acids possess materially higher acidity than the original inorganic boron compounds.

Although various intermixtures of boron compounds and organic polyhydroxy compounds may be employed for the regeneration of viscose, the following are formulæ which have been found by experiment to be efficient:

|     |            |      | pH value |
|-----|------------|------|----------|
| (1) | Borax      | 5%   |          |
|     | Glycerol   | 35%  | 5.70     |
|     | Water      | 60%  |          |
| (2) | Boric acid | 5%   |          |
|     | Glycerol   | 35%  | 3.45     |
|     | Water      | 60%  |          |
| (3) | Borax      | 5%   |          |
|     | Dextrose   | 30%  | 5.45     |
|     | Water      | 65%  |          |
| (4) | Boric acid | 5%   |          |
|     | Dextrose   | 30%  | 2.63     |
|     | Water      | 65%  |          |

Solutions prepared in accordance with the preceding formulæ may be employed in regenerating various mixtures and concentrations of viscose; for example, they may successfully be employed upon pure or substantially pure viscose either when the latter is in solution or when it is spread as a dry film upon a fabric base. These solutions may also be employed to regenerate viscose intermixed with such substances as latex and glycerol, either in solution or in the form of dry films upon the fabric.

A process which has been found to be highly satisfactory in the preparation of a coated fabric for use in the construction of gas cells involves first coating the fabric with a film consisting of the following ingredients:

| | Grams |
|---|---|
| Concentrated latex (preferably of the type known by the trade name "Revertex") | 120 |
| Sodium hydroxide (20% concentration) | 120 |
| Water | 138 |

Second, third, fourth and fifth coatings of material having respectively the following compositions are next applied:

(Second coat)

| | Grams |
|---|---|
| Concentrated latex (Revertex) | 72.8 |
| Viscose (7% concentration) | 114.3 |
| Glycerol | 4 |
| Water | 208 |

(Third coat)

| | Grams |
|---|---|
| Concentrated latex (Revertex) | 45.7 |
| Viscose (7% concentration) | 171.4 |
| Glycerol | 6 |
| Water | 176.9 |

(Fourth coat)

| | Grams |
|---|---|
| Concentrated latex (Revertex) | 32.7 |
| Viscose (7% concentration) | 228.6 |
| Glycerol | 8 |
| Water | 130.7 |

(Fifth coat)

| | Grams |
|---|---|
| Latex (Revertex) | 23.3 |
| Viscose (7% concentration) | 285 |
| Glycerol | 10 |
| Water | 81 |

Finally, the fabric is preferably treated with a plurality (approximately 20) of relatively thin coats of a solution made up as follows:

| | Grams |
|---|---|
| Latex (Revertex) | 247.2 |
| Viscose (7% concentration) | 5500 |
| Glycerol | 192.5 |
| Water | 447 |

In the application of these various coatings, it is desirable to permit each coat to dry at least partially before the application of the succeeding one. It is practicable to apply the regenerating medium to the viscose-containing coatings immediately after each such coating has been applied. However, in actual practice it is preferable to wait until the application of the final coating and then subject the whole to regeneration at a single application.

In the process of regenerating the viscose, any of the solutions previously described may be employed with success. Cellulose-containing films, when regenerated in this manner, are relatively tough, elastic and impermeable to inflating gases. Also, they are practically free from gas bubbles and similar imperfections which tend to cause peeling of the coating material from the fabric base. Furthermore, the coatings may be conveniently applied by suitable spreading or spraying devices at a minimum expenditure of time and effort.

Although there have been illustrated herein only the preferred forms which the invention may assume, it will be apparent to those skilled in the art that the invention is not limited thereto, but that various modifications may be made without departing from the spirit of the invention or from the scope of the appended claims. It is intended that the patent shall cover, by suitable expression in the appended claims, whatever features of patentable novelty reside in the invention.

What I claim is:

1. A method of regenerating cellulose in situ from a viscose-containing film comprising the step of applying thereto a composition consisting of water, a soluble organic polyhydroxy compound having a plurality of hydroxyl groups situated upon the same side of the chain attached to adjacent carbon atoms, and a material selected from a group consisting of borax and boric acid.

2. A method of regenerating cellulose from viscose in the absence of strong mineral acid comprising subjecting viscose to the action of a composition consisting, by weight, of water, 60–65%; borax, 5%; and a polyhydric alcohol selected from a group consisting of glycerol and glycol, 35–30%.

3. A method of regenerating cellulose from viscose in the absence of strong mineral acid comprising subjecting viscose to the action of a composition consisting, by weight, of water, 60–65%; boric acid, 5%; and a polyhydric alcohol selected from a group consisting of glycerol and glycol, 35–30%.

4. A method of regenerating cellulose from viscose in the absence of strong mineral acid comprising subjecting viscose to the action of a composition consisting, by weight, of water, 60–65%; borax, 5%; and a mono saccharose selected from a group consisting of dextrose and levulose.

5. A method of regenerating cellulose from viscose in the absence of strong mineral acid comprising subjecting viscose to the action of a composition consisting, by weight, of water, 60–65%; boric acid, 5%; and a mono saccharose selected from a group consisting of dextrose and levulose.

6. A method of regenerating cellulose from viscose in the absence of strong mineral acid comprising subjecting the viscose to the action of an aqueous solution of borax and a water soluble polyhydric alcohol having a plurality of hydroxyl groups situated upon the same side of the chain attached to different carbon atoms.

7. A method of regenerating cellulose from viscose in the absence of strong mineral acid comprising subjecting the viscose to the action of an aqueous solution of boric acid and a water soluble polyhydric alcohol having a plurality of hydroxyl groups situated upon the same side of the chain attached to different carbon atoms.

8. A method of regenerating cellulose from viscose in the absence of strong mineral acid comprising subjecting the viscose to the action of an aqueous solution of borax and a water soluble mono saccharose having a plurality of hydroxyl groups situated upon the same side of the chain attached to different carbon atoms.

9. A method of regenerating cellulose from viscose in the absence of strong mineral acid comprising subjecting the viscose to the action of an aqueous solution of boric acid and a water soluble mono saccharose having a plurality of hydroxyl groups situated upon the same side of the chain attached to different carbon atoms.

WILLIAM D. WOLFE.